US012033795B2

(12) United States Patent
Higuchi

(10) Patent No.: US 12,033,795 B2
(45) Date of Patent: Jul. 9, 2024

(54) SUPERCONDUCTING MAGNET DEVICE AND CYCLOTRON

(71) Applicant: SUMITOMO HEAVY INDUSTRIES, LTD., Tokyo (JP)

(72) Inventor: Akito Higuchi, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 218 days.

(21) Appl. No.: 17/712,918

(22) Filed: Apr. 4, 2022

(65) Prior Publication Data

US 2022/0328226 A1    Oct. 13, 2022

(30) Foreign Application Priority Data

Apr. 8, 2021 (JP) ................................. 2021-065751

(51) Int. Cl.
  *H01F 6/04* (2006.01)
  *H01F 6/06* (2006.01)
  *H05H 7/04* (2006.01)
  *H05H 13/00* (2006.01)

(52) U.S. Cl.
  CPC ............... *H01F 6/04* (2013.01); *H01F 6/06* (2013.01); *H05H 7/04* (2013.01); *H05H 13/005* (2013.01)

(58) Field of Classification Search
  None
  See application file for complete search history.

(56) References Cited

U.S. PATENT DOCUMENTS

| 4,986,077 A | * | 1/1991 | Saho | F25D 19/006 62/51.1 |
| 4,986,078 A | * | 1/1991 | Laskaris | F25D 19/006 62/51.1 |
| 5,045,826 A | * | 9/1991 | Laskaris | G01R 33/421 505/879 |
| 5,412,363 A | * | 5/1995 | Breneman | H01F 6/04 324/318 |
| 5,522,226 A | * | 6/1996 | Mruzek | F25D 19/006 62/51.1 |

(Continued)

FOREIGN PATENT DOCUMENTS

| GB | 2587378 A | * | 3/2021 | ......... G01R 33/3802 |
| JP | 2002-043117 A |  | 2/2002 | |

(Continued)

*Primary Examiner* — Srinivas Sathiraju
(74) *Attorney, Agent, or Firm* — Michael Best & Friedrich LLP

(57) ABSTRACT

To provide a superconducting magnet device enabling improved access to internal equipment. A superconducting magnet device includes: a superconducting coil; and a hollow tubular cryostat having an outer peripheral wall and an inner peripheral wall connected to each other so as to define a vacuum region where the superconducting coil is disposed. The cryostat has a tubular partition wall connecting the outer peripheral wall and the inner peripheral wall and a cavity partitioned from the vacuum region by the tubular partition wall is formed inside the tubular partition wall. The outer peripheral wall has an opening portion wide in the circumferential direction of the cryostat, and the opening portion communicates with the cryostat hollow portion radially inside the inner peripheral wall through the cavity.

6 Claims, 4 Drawing Sheets

(56) References Cited

U.S. PATENT DOCUMENTS

| | | | | |
|---|---|---|---|---|
| 5,613,367 | A * | 3/1997 | Chen | H01F 6/04 62/51.1 |
| 5,701,744 | A * | 12/1997 | Eckels | G01R 33/3815 62/51.1 |
| 5,918,470 | A * | 7/1999 | Xu | H01F 6/04 505/894 |
| 6,396,377 | B1 * | 5/2002 | Ying | H01F 6/04 505/892 |
| 6,696,130 | B1 * | 2/2004 | Kasai | C04B 38/0006 422/177 |
| 11,222,740 | B2 * | 1/2022 | Tanaka | F25D 19/00 |
| 11,375,603 | B2 * | 6/2022 | Morie | H05H 13/005 |
| 11,619,691 | B2 * | 4/2023 | Wu | G01R 33/3403 335/216 |
| 2009/0145334 | A1 * | 6/2009 | Komiyama | F27D 1/0006 106/694 |
| 2009/0149311 | A1 * | 6/2009 | Komiyama | C04B 35/195 501/133 |
| 2009/0169848 | A1 * | 7/2009 | Komiyama | C04B 35/195 428/315.7 |
| 2010/0025324 | A1 * | 2/2010 | Komiyama | C22B 9/023 264/42 |
| 2014/0329688 | A1 * | 11/2014 | Aoki | H01F 6/02 324/318 |
| 2017/0117076 | A1 * | 4/2017 | Miyazoe | H01F 6/04 |
| 2017/0287608 | A1 * | 10/2017 | Oka | H01F 6/06 |
| 2018/0143273 | A1 * | 5/2018 | Martien | H01F 6/04 |
| 2018/0284413 | A1 * | 10/2018 | Kubo | G01N 21/6458 |
| 2018/0299488 | A1 * | 10/2018 | Jordan | H01Q 1/38 |
| 2019/0011170 | A1 * | 1/2019 | Morie | F25B 9/10 |
| 2019/0178961 | A1 * | 6/2019 | Morita | G01R 33/3804 |
| 2020/0027633 | A1 * | 1/2020 | Matsumura | F25B 9/002 |
| 2020/0348379 | A1 * | 11/2020 | Wu | F17C 13/007 |
| 2021/0068243 | A1 * | 3/2021 | Morie | H05H 7/04 |
| 2021/0241953 | A1 * | 8/2021 | Tanaka | H01F 6/04 |
| 2022/0020516 | A1 * | 1/2022 | Yu | G01R 33/3804 |
| 2022/0328226 | A1 * | 10/2022 | Higuchi | H05H 13/005 |
| 2022/0397311 | A1 * | 12/2022 | Ito | H01F 6/04 |
| 2023/0020572 | A1 * | 1/2023 | Demura | H01F 6/04 |

FOREIGN PATENT DOCUMENTS

| | | | | |
|---|---|---|---|---|
| WO | WO-2021214837 | A1 * | 10/2021 | H01F 6/04 |
| WO | WO-2022185568 | A1 * | 9/2022 | H01F 6/04 |

* cited by examiner

SUPERCONDUCTING MAGNET DEVICE AND CYCLOTRON

RELATED APPLICATIONS

The content of Japanese Patent Application No. 2021-065751, on the basis of which priority benefits are claimed in an accompanying application data sheet, is in its entirety incorporated herein by reference.

BACKGROUND

Technical Field

Certain embodiments of the present invention relate to a superconducting magnet device and a cyclotron.

Description of Related Art

A superconducting magnet device that has a circular ring-shaped superconducting coil and a hollow cylindrical vacuum chamber accommodating the superconducting coil is known in the related art, and the superconducting magnet device is used in various high magnetic field utilization devices such as a cyclotron.

SUMMARY

A superconducting magnet device according to an aspect of the present invention includes: a superconducting coil; and a hollow tubular cryostat including an outer peripheral wall and an inner peripheral wall connected to each other so as to define a vacuum region where the superconducting coil is disposed. The cryostat includes a tubular partition wall connecting the outer peripheral wall and the inner peripheral wall and a cavity partitioned from the vacuum region by the tubular partition wall is formed inside the tubular partition wall. The outer peripheral wall includes an opening portion wide in a circumferential direction of the cryostat and the opening portion communicates with a cryostat hollow portion radially inside the inner peripheral wall through the cavity.

A cyclotron according to an aspect of the present invention includes: the superconducting magnet device described above; an acceleration unit disposed in the cryostat hollow portion and accelerating while spirally orbiting a charged particle; and an extraction unit extending through the cavity to the opening portion and extracting the charged particle accelerated by the acceleration unit.

DETAILED DESCRIPTION

Figure 1:
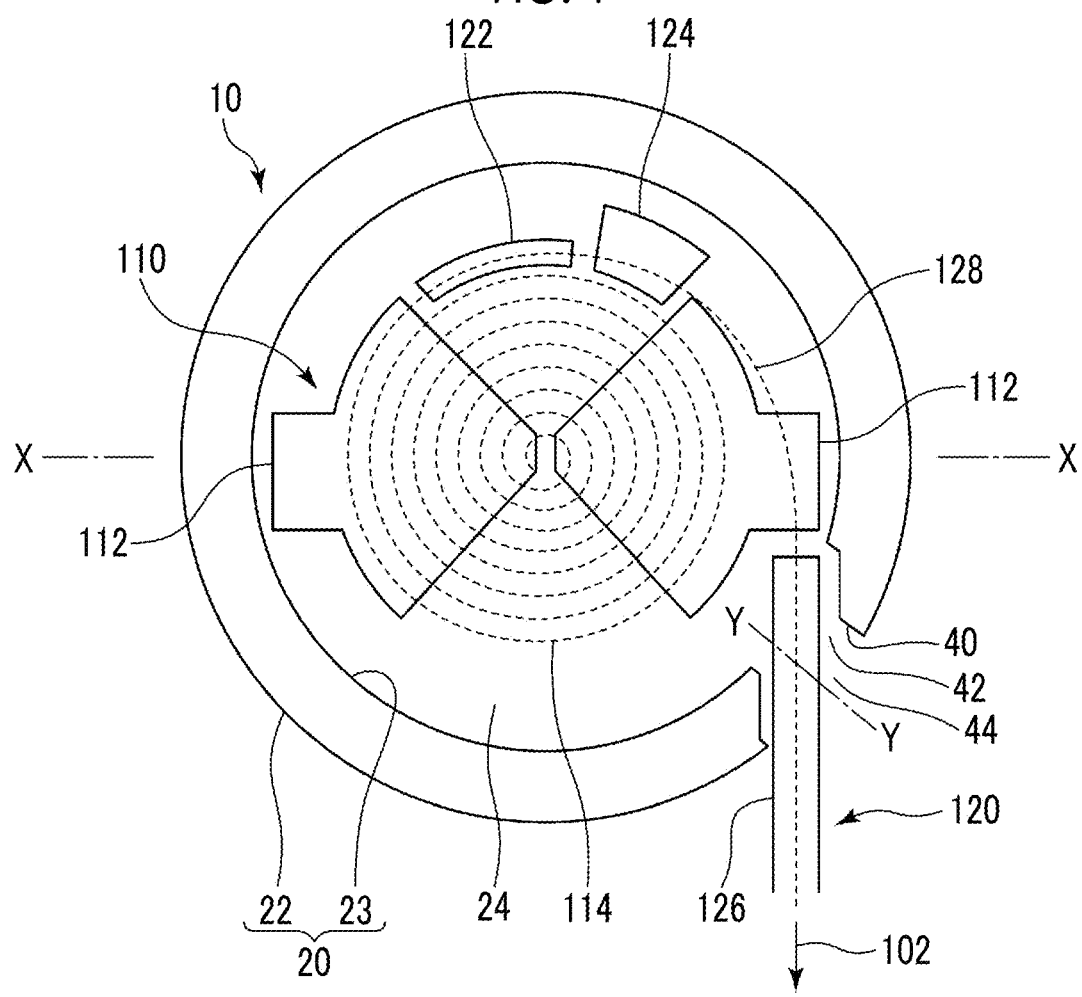
FIG. 1 is a diagram schematically illustrating an example of a cyclotron according to an embodiment.

In the superconducting magnet device described above, a closed space surrounded by the vacuum chamber and another member is formed in a hollow portion radially inside the vacuum chamber and related equipment is often installed in this closed space. During the operation of superconducting magnet device, a worker may need to perform maintenance work such as inspection and replacement on the internal equipment, but accessibility from the outside of the vacuum chamber to the closed space is not always fully considered and there is room for improvement.

It is desirable to provide a superconducting magnet device enabling improved access to internal equipment.

According to the present invention, it is possible to provide a superconducting magnet device enabling improved access to internal equipment.

Hereinafter, an embodiment for carrying out the present invention will be described in detail with reference to the drawings. In the description and drawings, the same or equivalent components, members, and processes are denoted by the same reference numerals with redundant description omitted as appropriate. The scales and shapes of the illustrated parts are set for convenience of description and are not limitedly interpreted unless otherwise specified. The embodiment is exemplary and does not limit the scope of the present invention in any way. Not all features and combinations thereof described in the embodiment are essential to the invention.

Figure 2:
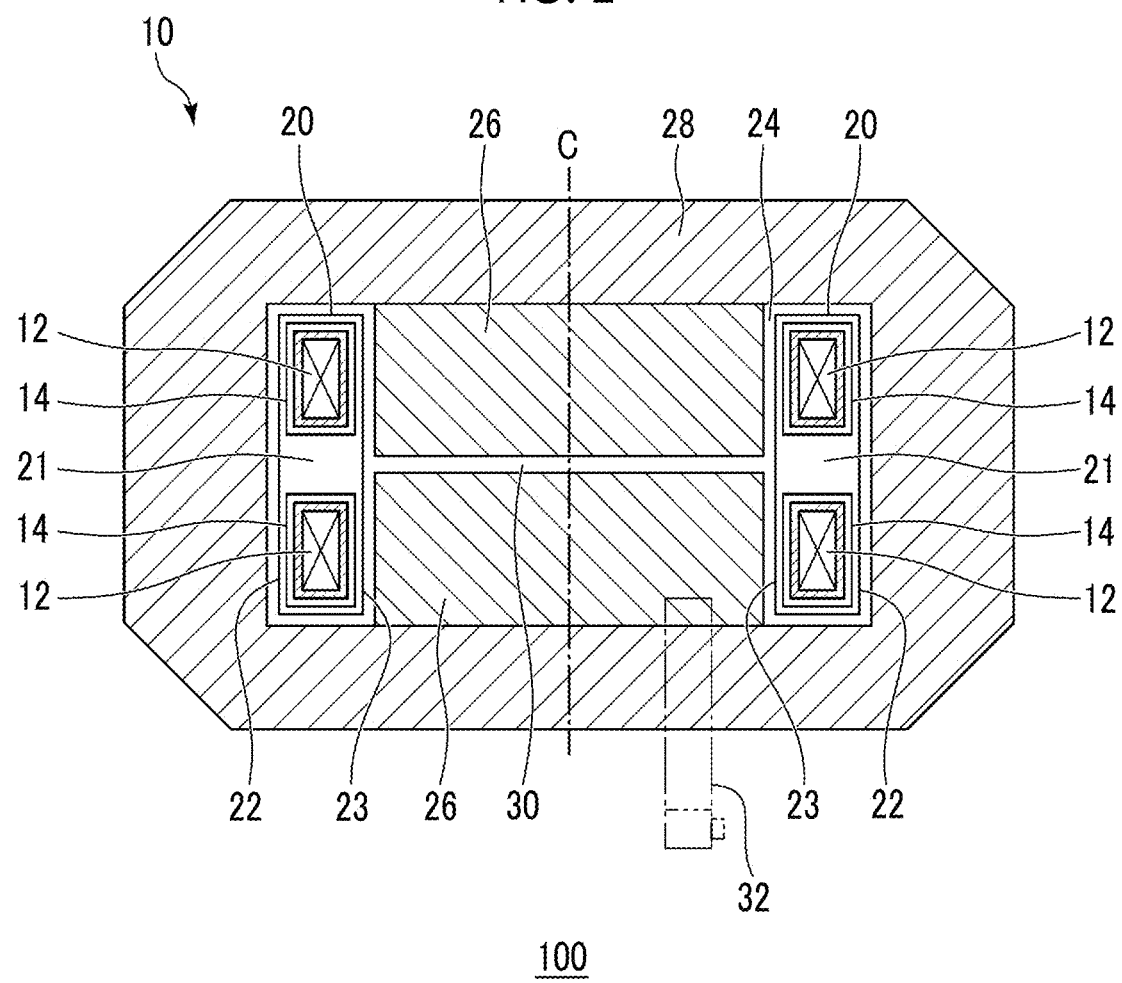
FIG. 2 is a cross-sectional view schematically illustrating the X-X line cross section of the cyclotron illustrated in FIG. 1.
Figure 3:
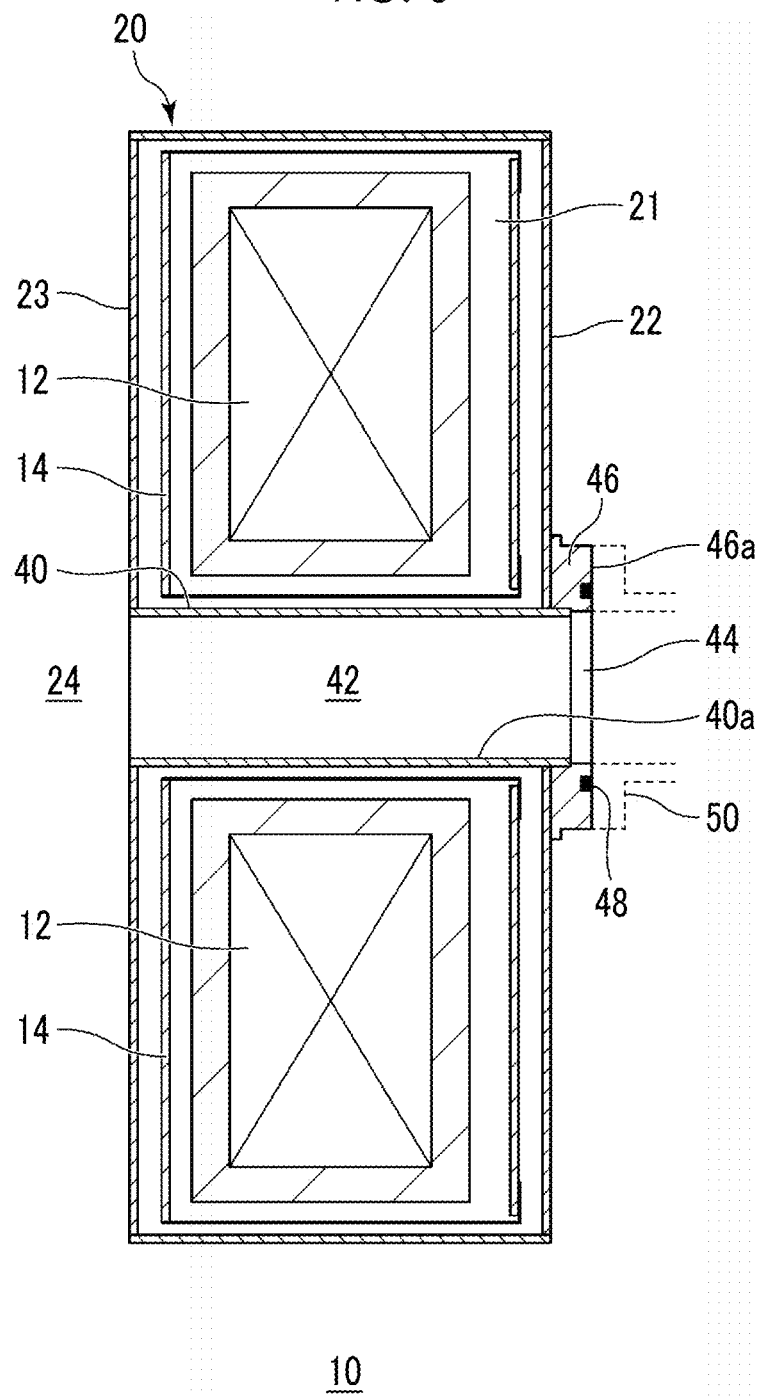
FIG. 3 is a cross-sectional view schematically illustrating the Y-Y line cross section of the cyclotron illustrated in FIG. 1.

FIG. 1 is a diagram schematically illustrating an example of a cyclotron according to the embodiment. FIG. 2 is a cross-sectional view schematically illustrating the X-X line cross section of the cyclotron illustrated in FIG. 1. FIG. 3 is a cross-sectional view schematically illustrating the Y-Y line cross section of the cyclotron illustrated in FIG. 1.

As illustrated in FIG. 1, a cyclotron 100 is a circular accelerator that accelerates charged particles and outputs a charged particle beam 102. Examples of the charged particles include protons, heavy particles (heavy ions), and electrons. The cyclotron 100 is used as, for example, an accelerator for charged particle beam therapy. The cyclotron 100 may be used in other charged particle utilization devices.

The cyclotron 100 includes a superconducting magnet device 10, an acceleration unit 110, and an extraction unit 120. In FIG. 1, for ease of understanding, the illustration of the iron core provided in the cyclotron 100 is omitted and some internal components disposed in the closed space surrounded by the iron core are schematically illustrated.

Referring to FIGS. 1 to 3, the superconducting magnet device 10 includes a pair of superconducting coils 12 and a cryostat 20 accommodating the two superconducting coils 12. The two superconducting coils 12 have circular ring shapes of the same diameter centered on a center axis C and are disposed so as to be spaced apart from each other in the axial direction (direction of the center axis C). The cryostat 20 is a hermetic container that provides the superconducting coil 12 with a cryogenic vacuum environment for putting the superconducting coil 12 into a superconducting state.

The cryostat 20 has a hollow tubular shape disposed coaxially with the center axis C and has an outer peripheral wall 22 and an inner peripheral wall 23 connected to each other so as to define a vacuum region 21 in which the superconducting coil 12 is disposed. A magnetic field is generated in the axial direction by the superconducting coil 12 in a cryostat hollow portion 24 radially inside the inner peripheral wall 23 of the cryostat 20.

As illustrated in FIG. 3, the cryostat 20 is provided with two heat shields 14 respectively corresponding to the pair of superconducting coils 12. The heat shield 14 is disposed in the vacuum region 21 so as to surround the superconducting coil 12 in order to reduce heat intrusion into the superconducting coil 12.

In addition, as illustrated in FIG. 2, the cyclotron 100 includes a pair of poles 26 disposed in the cryostat hollow portion 24 and a yoke 28 constituting a magnetic circuit together with the poles 26. The two poles 26 are disposed inside the respectively corresponding superconducting coils 12 and constitute a superconducting electromagnet with an iron core. The yoke 28 surrounds the cryostat 20 and the cryostat hollow portion 24 and makes the cryostat hollow portion 24 a closed space isolated from the outside. Although not illustrated in FIG. 2, the acceleration unit 110 is disposed in the gap 30 between the poles 26, which is a part of the closed space.

A cryocooler 32 for cooling the superconducting coil 12 is installed at the cryostat 20. The cryocooler 32 includes a compressor (not illustrated) for refrigerant gas (for example, helium gas) and an expander also called a cold head, the compressor and the expander constitute the refrigeration cycle of the cryocooler 32, and cryogenic cooling is provided as a result. The cold head of the cryocooler 32 is connected (or directly attached) to the superconducting coil 12 via an appropriate heat transfer member and is thermally coupled to the superconducting coil 12. In other words, in this embodiment, the superconducting coil 12 is not cooled by immersion in a cryogenic refrigerant such as liquid helium but the cryocooler 32 cools the superconducting coil 12 by conduction cooling.

In a case where the cryocooler 32 is a two-stage cryocooler, the heat shield 14 may be cooled to a first cooling temperature (for example, 30 K to 80 K) in the cooling stage of the high temperature stage of the cold head and the superconducting coil 12 may be cooled to a second cooling temperature (for example, 3 K to 20 K) lower than the first cooling temperature in the cooling stage of the low temperature stage of the cold head. Although the cryocooler 32 is, for example, a Gifford-McMahon (GM) cryocooler, the cryocooler 32 may be a pulse tube cryocooler, a Stirling cryocooler, or another type of cryocooler. Although a plurality of the cryocoolers 32 are typically installed at the cryostat 20, only one is illustrated for the sake of simplicity in the drawing.

In this embodiment, the cryostat 20 has a tubular partition wall 40 connecting the outer peripheral wall 22 and the inner peripheral wall 23 and a cavity 42 partitioned from the vacuum region 21 by the tubular partition wall 40 is formed inside the tubular partition wall 40. The cavity 42 penetrates the tubular partition wall 40 from the outer peripheral wall 22 to the inner peripheral wall 23. The outer peripheral wall 22 has an opening portion 44 wide in the circumferential direction of the cryostat 20, and the opening portion 44 communicates with the cryostat hollow portion 24 radially inside the inner peripheral wall 23 through the cavity 42.

Although the cryostat 20 may be provided with a related component, further description and illustration are omitted for the sake of simplicity in this document. Examples of the component include a current terminal portion for power supply from an external power source to the superconducting coil 12, a load support body for supporting the superconducting coil 12 on the cryostat 20, and measuring equipment for a charged particle beam.

As illustrated in FIG. 1, the acceleration unit 110 is disposed in the cryostat hollow portion 24 and is configured to accelerate while spirally orbiting charged particles. The acceleration unit 110 has an acceleration electrode 112, which is also referred to as a dee electrode. The charged particles are supplied from a charged particle source (not illustrated) to the central portion of the acceleration unit 110. The charged particles are accelerated along a spiral acceleration trajectory 114 by the electric field generated by the acceleration electrode 112 and the axial magnetic field generated by the superconducting coil 12.

The extraction unit 120 is configured to extract the charged particles accelerated by the acceleration unit 110 from the acceleration unit 110 to the outside of the cyclotron 100. The charged particles extracted from the acceleration unit 110 by the extraction unit 120 are extracted from the cryostat hollow portion 24 through the cavity 42 and the opening portion 44.

As an exemplary configuration, the extraction unit 120 has a deflector 122, a magnetic channel 124 disposed downstream of the deflector 122, and a beam extraction duct 126 disposed downstream of the magnetic channel 124. The deflector 122 and the magnetic channel 124 deflect the charged particles traveling on the outermost periphery of an acceleration trajectory 114 to an extraction trajectory 128. The charged particles traveling in the extraction trajectory 128 are extracted to the outside of the cyclotron 100 through the beam extraction duct 126. The charged particle beam 102 extracted in this manner travels to a beam irradiation unit via a beam transport system (not illustrated).

At least apart of the extraction unit 120 (for example, the beam extraction duct 126) is accommodated in the cavity 42. The beam extraction duct 126 extends from the cryostat hollow portion 24 to the outside of the cryostat 20 through the cavity 42 and the opening portion 44. As illustrated in FIG. 1, the beam extraction duct 126 extends in a direction oblique to the radial direction of the cryostat 20 in a plane perpendicular to the axial direction. Accordingly, the tubular partition wall 40 extends in the oblique direction in which the extraction unit 120 extends and connects the outer peripheral wall 22 to the inner peripheral wall 23.

As illustrated in FIG. 3, the circumferentially wide opening portion 44 is disposed between the pair of superconducting coils 12 in the axial direction (up-down direction in FIG. 3) and the tubular partition wall 40 connects the outer peripheral wall 22 and the inner peripheral wall 23 through between the pair of superconducting coils 12. Since each superconducting coil 12 is surrounded by the heat shield 14 as described above, the tubular partition wall 40 is positioned between the two heat shields 14 surrounding the two superconducting coils 12. In this manner, the tubular partition wall 40 is capable of avoiding interference with the superconducting coil 12 and the heat shield 14.

One end of the tubular partition wall 40 is joined to the outer peripheral wall 22, and the other end of the tubular partition wall 40 is joined to the inner peripheral wall 23. An appropriate joining method such as welding is used in joining the tubular partition wall 40 to the outer peripheral wall 22 and the inner peripheral wall 23. In this manner, airtightness is ensured at the joints between the tubular partition wall 40 and the outer peripheral wall 22 and the inner peripheral wall 23.

The tubular partition wall 40 has at least one flat inner surface 40a facing the cavity 42. In this embodiment, the inner surface 40a corresponds to the lower surface of the tubular partition wall 40. In installing equipment (for example, equipment as a component of the extraction unit 120 such as the deflector 122, the magnetic channel 124, and the beam extraction duct 126) in the cavity 42 in the tubular partition wall 40, the flat inner surface 40a can be used as an equipment installation surface. In this manner, the equipment can be easily installed as compared with a curved surface such as a cylinder. Likewise, the upper and side surfaces of the tubular partition wall 40 may be flat and these surfaces may be used as equipment installation surfaces.

Figure 4:
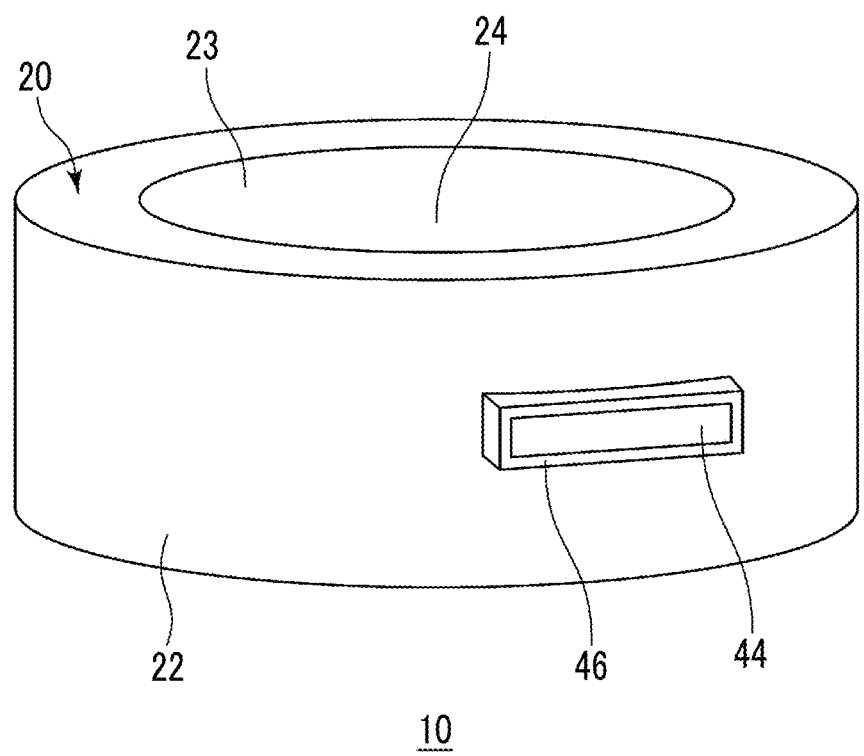
FIG. 4 is a perspective view schematically illustrating the appearance of a superconducting magnet device according to the embodiment.
Figure 5:
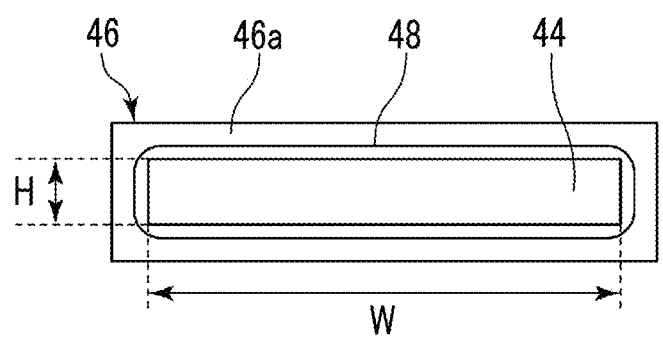
FIG. 5 is a front view schematically illustrating an opening portion according to the embodiment.

FIG. 4 is a perspective view schematically illustrating the appearance of the superconducting magnet device according to the embodiment. FIG. 5 is a front view schematically illustrating the opening portion 44 according to the embodiment.

As illustrated in FIGS. 3 to 5, the outer peripheral wall 22 is provided with an opening portion flange 46. The opening portion flange 46 is provided with a flat flange surface 46a facing outward in the radial direction, and the flange surface 46a is provided with the circumferentially wide opening portion 44. A circumferential width W of the opening portion 44 is larger than an axial height H of the opening portion 44. For example, the width W may be 2 to 10 times the height H. The opening portion flange 46 is a square flange elongated in the circumferential direction, is prepared as a member separate from the outer peripheral wall 22, and is fixed to the outer peripheral wall 22 at the joint between the outer peripheral wall 22 and the tubular partition wall 40. In this manner, the opening portion 44 serves as an inlet from the outside to the cavity 42 in the tubular partition wall 40.

In addition, a vacuum sealing member 48 is mounted on the flange surface 46a so as to surround the circumferentially wide opening portion 44. A receiving groove receiving the vacuum sealing member 48 may be formed in the flange surface 46a so as to surround the opening portion 44, and the vacuum sealing member 48 may be accommodated in this receiving groove. In this manner, when a mating flange 50 (for example, a flange portion of another vacuum pipe) is connected to the opening portion flange 46, the vacuum sealing member 48 is sandwiched between the two flanges, and thus internal airtightness can be maintained.

The vacuum sealing member 48 may be, for example, a metal seal (metallic O-ring). Ina case where the sealing member is made of synthetic resin, since the vacuum sealing member 48 is disposed in the vicinity of the extraction unit 120, there is a concern as to an effect of radiation on the vacuum sealing member 48 attributable to the charged particle beam extracted through the extraction unit 120 (for example, deterioration attributable to radiation). On the other hand, by adopting a metal seal as the vacuum sealing member 48, such an adverse effect can be reduced and the long-term reliability of the vacuum sealing can be improved.

By the way, a typical design in a case where a component of an existing cyclotron needs to be installed through a cryostat is to provide the cryostat with a cylindrical through wall that has the minimum internal volume at which the component passes. The through wall and the component are in close proximity or in contact with each other, and thus there is little or no gap between the through wall and the component.

As described at the beginning of this document, various types of related equipment may be disposed in a closed space inside a cryostat and maintenance work on the equipment may be required in a timely manner. In the superconducting magnet device 10 according to the embodiment, the cavity 42 in the tubular partition wall 40 and the cryostat hollow portion 24 inside the cryostat 20 can be accessed from the circumferentially wide opening portion 44. Accordingly, with the superconducting magnet device 10 according to the embodiment, accessibility from the outside of the cryostat 20 to the equipment disposed in the cavity 42 and the cryostat hollow portion 24 is improved.

The present invention has been described above based on examples. It will be understood by those skilled in the art that the present invention is not limited to the above embodiment, various design changes and modification examples are possible, and such modification examples are also within the scope of the present invention. Various features described in relation to one embodiment are also applicable to another embodiment. Anew embodiment resulting from combination has the effect of each of the combined embodiments.

The cryostat 20 in the above embodiment is provided with one opening portion 44 and one cavity 42, but a plurality of the opening portions 44 and a plurality of the cavities 42 may be provided. These opening portions 44 and cavities 42 may be provided at circumferentially different positions of the cryostat 20 (for example, at equal intervals in the circumferential direction). The cyclotron 100 may include one or more extraction units 120 with each extraction unit 120 extending through the corresponding opening portion 44 and cavity 42. In addition, the opening portion 44 and the cavity 42 may lack the extraction unit 120.

The superconducting magnet device 10 may be mounted on a device other than the cyclotron 100. For example, the superconducting magnet device 10 may be mounted on high magnetic field utilization equipment as a magnetic field source for the high magnetic field utilization equipment (for example, a high-energy physical system such as a single crystal pulling device, an NMR system, an MRI system, an accelerator, and a nuclear fusion system) to generate a high magnetic field required for the equipment.

It is not essential that the superconducting coils 12 are disposed in pairs in the up-down direction in the cryostat 20, and the disposition of the superconducting coil 12 may be changed depending on the application and design of the superconducting magnet device 10. For example, a plurality of the superconducting coils 12 may be arranged in the circumferential direction of the cryostat 20 between the outer peripheral wall 22 and the inner peripheral wall 23 of the cryostat 20 such that the center axis of each superconducting coil 12 coincides with the radial direction of the cryostat 20.

The present invention has been described using specific terms and phrases based on the embodiment, but the embodiment shows only one aspect of the principles and applications of the present invention. In the embodiment, many modification examples and disposition changes are permitted without departing from the ideas of the present invention defined in the claims.

It should be understood that the invention is not limited to the above-described embodiment, but may be modified into various forms on the basis of the spirit of the invention. Additionally, the modifications are included in the scope of the invention.

What is claimed is:

1. A superconducting magnet device comprising:
    a superconducting coil; and
    a hollow tubular cryostat including an outer peripheral wall and an inner peripheral wall connected to each other so as to define a vacuum region where the superconducting coil is disposed,
    wherein the cryostat includes a tubular partition wall connecting the outer peripheral wall and the inner peripheral wall and a cavity partitioned from the vacuum region by the tubular partition wall is formed inside the tubular partition wall, and
    the outer peripheral wall includes an opening portion wide in a circumferential direction of the cryostat and the opening portion communicates with a cryostat hollow portion radially inside the inner peripheral wall through the cavity so as to enable access from an outside of the cryostat to internal equipment disposed in the cavity and to the cryostat hollow portion.

2. The superconducting magnet device according to claim 1,
wherein the tubular partition wall includes at least one flat inner surface facing the cavity.

3. The superconducting magnet device according to claim 1,
wherein a pair of superconducting coils including the superconducting coil and another superconducting coil disposed axially apart from the superconducting coil in the cryostat is provided, each of the pair of superconducting coils generating a magnetic field in an axial direction in the cryostat hollow portion, and
the opening portion wide in the circumferential direction is disposed between the pair of superconducting coils in the axial direction and the tubular partition wall connects the outer peripheral wall and the inner peripheral wall through between the pair of superconducting coils.

4. The superconducting magnet device according to claim 1,
wherein a circumferential width of the opening portion is larger than an axial height of the opening portion.

5. The superconducting magnet device according to claim 1,
wherein the outer peripheral wall is provided with an opening portion flange provided with a flange surface including the opening portion wide in the circumferential direction and a vacuum sealing member is mounted on the flange surface so as to surround the opening portion wide in the circumferential direction.

6. A cyclotron comprising:
the superconducting magnet device according to claim 1;
an acceleration unit disposed in the cryostat hollow portion and accelerating while spirally orbiting a charged particle; and
an extraction unit extracting the charged particle accelerated by the acceleration unit from the cryostat hollow portion through the cavity and the opening portion.

* * * * *